Figure 1:
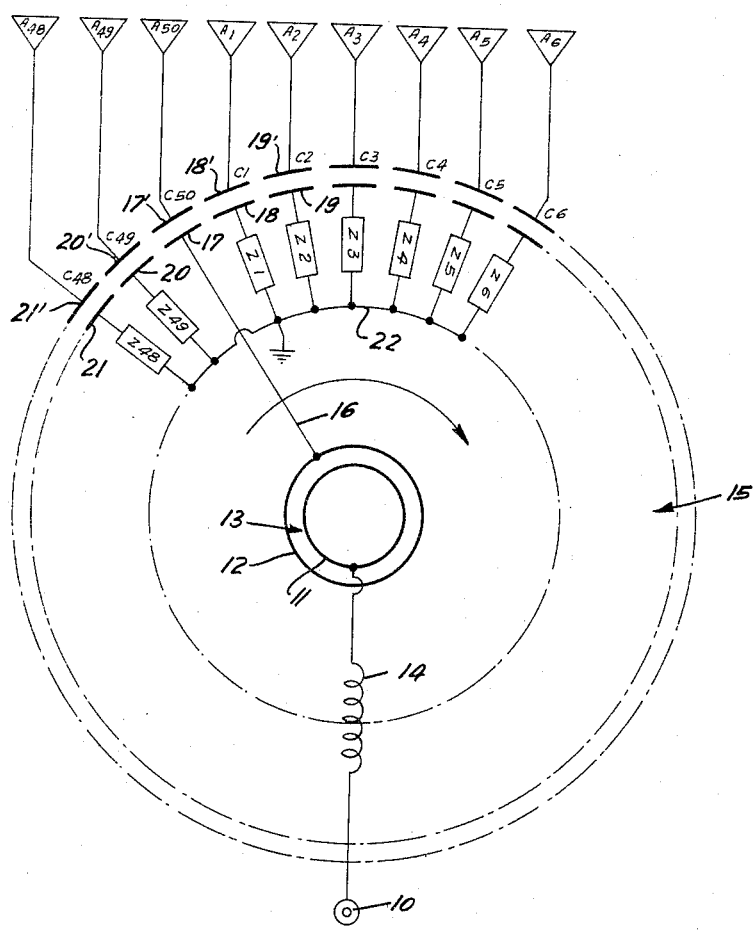

Oct. 19, 1965

P. G. HANSEL ETAL  3,213,458

COMMUTATOR WITH ANTENNA-INTERACTION SUPPRESSOR

Filed Dec. 22, 1959

2 Sheets-Sheet 1

INVENTORS.
PAUL G. HANSEL
WILLIAM H. PAULSTICH
BY FREDERICK G. RICHTER

Mitchell & Bechert
ATTORNEYS

Oct. 19, 1965  P. G. HANSEL ETAL  3,213,458
COMMUTATOR WITH ANTENNA-INTERACTION SUPPRESSOR
Filed Dec. 22, 1959  2 Sheets-Sheet 2

INVENTORS.
PAUL G. HANSEL
WILLIAM H. PAULSTICH
FREDERK G. RICHTER
BY
Mitchell & Bechert
ATTORNEYS 3,213,458
COMMUTATOR WITH ANTENNA-INTERACTION SUPPRESSOR
Paul G. Hansel, Greenvale, William H. Paulstich, Merrick, and Frederick G. Richter, Great Neck, N.Y., assignors to Servo Corporation of America, Hicksville, N.Y., a corporation of New York
Filed Dec. 22, 1959, Ser. No. 861,382
5 Claims. (Cl. 343—876)

This invention relates to direction finding navigation equipment and, more particularly, to a quasi-Doppler, VHF-omnirange navigation system.

A Doppler, VHF-omnirange navigation system, generally, employs a rotating antenna, as contrasted with a quasi-Doppler, variable omnirange system which employs a plurality of antennas fixed in a predetermined array.

In a quasi-Doppler system, the momentarily inactive antennas cause distortion in the signal emitted by the active antenna due to parasitic absorption of energy by the inactive antennas. In addition, the momentarily inactive antennas disturb the phase of the radiated signal resulting in errors in the accuracy of the system.

It is an object of this invention, therefore, to reduce and eliminate the above-mentioned disadvantages.

Also it is an object of the invention to provide a means to couple a signal to successive output terminals without undesired effects to the signal.

Another object of the invention is to provide an antenna coupling element with means to suppress interaction of signals between adjacent antenna elements.

Generally, the invention provides a unique arrangement whereby a revolvable member is connected with an input terminal and has a portion extended to couple with successive output terminals. In addition, means is provided adjacent the coupling portion to prevent interaction due to inactive output terminals being near a predetermined active output terminal.

In one form of the invention, an electrically conductive path is formed on a member which is adapted for rotation. An input terminal for an electrical signal is connected with the electrically conductive path at a point approximating the center of rotation, and the opposite end of the path is coupled electrically with successive output terminals as the member is rotated. Interference from signals that may be developed in paths adjacent the rotatable member is prevented by forming auxiliary electrically conductive paths which are terminated in appropriate impedances to dampen and dissipate any interference signals which are developed.

Figure 2:
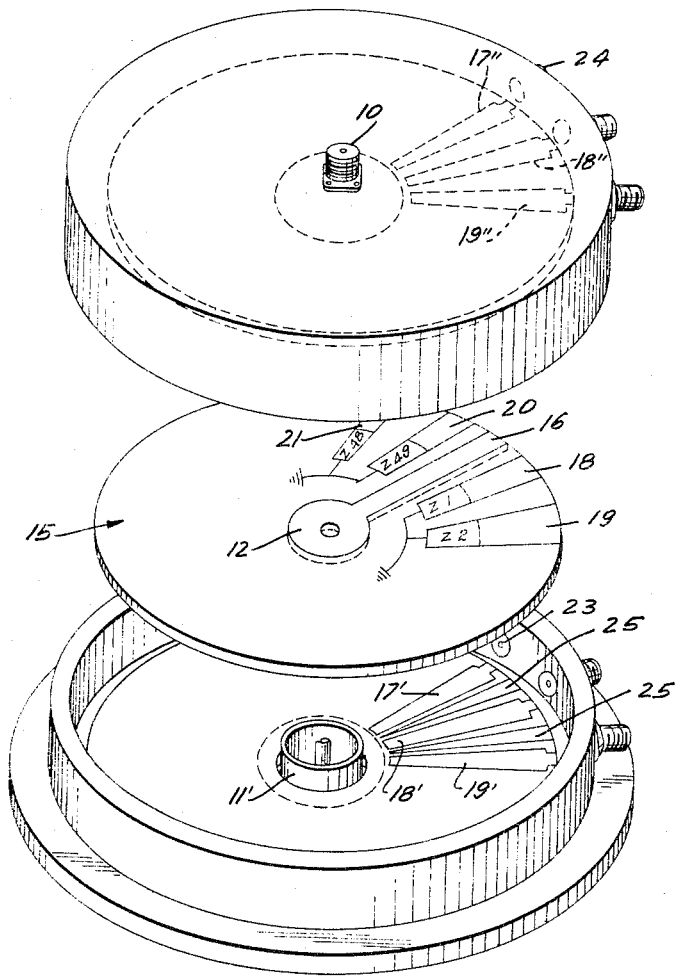

The above and other objects and advantages of the invention will be understood more readily from the following detailed description of one preferred embodiment thereof when taken in conjunction with the accompanying drawings, in which:

FIG. 1 is a diagrammatic view illustrating the electrical connections between the respective components in accordance with the invention; and FIG. 2 is an exploded view in perspective of one structural arrangement constructed in accordance with the invention.

Referring now to the schematic electrical diagram shown in FIG. 1, an input terminal 10 is coupled to one plate 11 of a capacitor 13 through a suitable inductor 14. The other plate 12 of the capacitor 13 is formed on a revolvable member 15 to be rotated therewith about the fixed plate 11, and since the two plates 11 and 12 of the capacitor 13 are circular, the rotation of the plate 12 about the plate 11 does not affect the electrical coupling of a signal from the input terminal 10 to an electrically conductive path 16 formed on the revolvable member 15.

The electrically conductive path 16 extends radially from the plate 12 of the capacitor 13 and terminates at a plate 17 which is coupled successively with plates of a plurality of capacitors which are disposed in an array around the revolvable member 15. Each of the capacitors in the circular array is identified by the designation $C_1$, $C_2$, $C_3$ . . . $C_{50}$ in FIG. 1 of the drawings, and the respective fixed-position antenna to which each capacitor $C_1$, $C_2$, etc. is connected is identified by the designation $A_1$, $A_2$, . . . $A_{50}$.

With the revolvable member 15 in the particular position shown in FIG. 1, the plate 17 of the electrical path 16 is in position to couple a signal from the input terminal 10 through the capacitor $C_{50}$ to the antenna element $A_{50}$. As the revolvable member 15 turns, the plate 17 thereon couples the signal respectively with each successive capacitor and, therefore, the signal is coupled to successive antenna elements.

Spurious signals which develop in the plate 17 due to the proximity of the plates forming the adjacent capacitors are suppressed by placing auxiliary plates 18, 19, 20 and 21 on each side of the active plate 17 and connecting each auxiliary plate to an impedance. Although only two auxiliary plates will be sufficient to prevent interaction between the active plate 17 and adjacent plates of antenna elements, in most instances, a plurality of auxiliary plates is shown in FIG. 1 to couple all of the inactive plates of antenna elements.

Each of the auxiliary plates is connected through a suitable impedance, indicated by the designation $Z_1$, $Z_2$, . . . $Z_{49}$ to a common terminal 22. The choice of values for the inactive element impedances will depend upon the working frequency of the active antenna element. In general, the principle to be followed in selecting a terminating impedance is that the inactive elements should be both detuned and heavily damped for any signals of a frequency that will affect the working frequency. Therefore, the terminating impedance will ordinarily include a reactance (inductance or capacitance) for detuning and also a resistance for damping.

The principles of the invention are applicable equally to the distribution elements being capacitive, inductive, or purely electronic. While capacitive coupling elements are shown in one of the drawings, inductive elements may be used, if desired, such as illustrated in copending application of Paul G. Hansel, Serial No. 794,635, filed February 20, 1959, and assigned to the assignee of the present invention.

Referring now to FIG. 2 of the drawings, similar reference numerals are used to indicate component parts which correspond with those shown in FIG. 1. The rotatable member 15, FIG. 2, is provided with an electrically conductive path 16 which terminates at its innermost end in a capacitor plate 12. The fixed plate 11' of the capacitive element is shown in FIG. 2 as being cylindrical in form.

In the position of the component parts shown in FIG. 2, the electrically conductive path 16 is coupled with a capacitor plate 17' and with an additional capacitor plate 17", thus illustrating that the plate 17' may be a split plate with the plate 17 passing therebetween.

In FIG. 2, each plate 17' and 17" is connected with an output terminal 23 and 24, respectively, for transmitting a signal to the antenna element $A_{50}$. Also shown in FIG. 2 are shield elements 25 which may be located, if desired, intermediate each of the capacitor plates 17', 18', 19', etc. to prevent interaction between the adjacent plates. Similar shield elements may be positioned intermediate the plates 17", 18", etc.

While the invention has been described in considerable detail and a preferred form thereof illustrated , it is to be understood that various changes and modifications may be made therein, without departing from the true spirit

We claim:

1. In a VHF omnirange quasi-Doppler navigation system having an array of antenna elements and means to couple a signal source successively to each antenna element, said coupling means comprising an input terminal, a revolvable member connected electrically to said input terminal and having an electrically conductive extended portion, a plurality of output terminals for connection to respective antenna elements, means connected respectively with each of said output terminals to couple said signal source with each successive antenna as said revolvable member is revolved, and means adjacent said electrically conductive portion and movable with said revolvable member to suppress interaction of signals between adjacent antenna elements, said latter mentioned means including a terminating impedance connected to ground and comprising a predetermined value of reactance for detuning said signals and a predetermined value of resistance for dampening said signals.

2. In a VHF omnirange quasi-Doppler navigation system having an array of antenna elements and means to couple a signal source successively to each antenna element, said coupling means comprising an input terminal, a revolvable member connected electrically to said input terminal, an electrically conductive extended portion formed on said revolvable member, a plurality of output terminals for connection to respective antenna elements, means connected respectively with each of said output terminals to couple said signal source with each successive antenna as said revolvable member is revolved, and signal detuning and dampening means adjacent said electrically conductive portion to suppress interaction of signals between adjacent antenna elements.

3. In a VHF omnirange quasi-Doppler navigation system having an array of antenna elements and means to couple a signal source successively to each antenna element, said coupling means comprising an input terminal, a revolvable member connected capacitively to said input terminal, an electrically conductive extended portion for revolving with said revolvable member, said electrically conductive extended portion terminating in a plate of a capacitor, a second plate of said terminating capacitor being formed by a plate of a respective antenna element which is adjacent said electrically conductive extended portion, and signal detuning and dampening means adjacent said electrically conductive portion to suppress interaction of signals between adjacent antenna elements.

4. In a VHF omnirange quasi-Doppler navigation system having an array of antenna elements and means to couple a signal source successively to each of said antenna elements, said coupling means comprising a revolvable member mounted for rotation about a predetermined axis, an input terminal adapted to receive a signal to be transmitted, an electrically conductive extended portion formed on said revolvable member from a point adjacent the axis of rotation and extending radially therefrom, means to couple said input terminal with said electrically conductive extended portion, a plurality of output terminals for connection to respective antenna elements, means connected respectively with each of said output terminals to couple said signal source with each successive antenna element as said revolvable member is revolved, and signal detuning and dampening means adjacent said electrically conductive portion to suppress interaction of signals between adjacent antenna elements.

5. In a VHF omnirange quasi-Doppler navigation system having an array of antenna elements and means to couple a signal source successively to each antenna element, said coupling means comprising a revolvable member mounted to be revolved about a predetermined axis, an electrically conductive extended portion on said revolvable member and extending radially thereon, an input terminal, means to connect said input terminal electrically with said electrically conductive extended portion, said electrically conductive extended portion being terminated in one plate of a capacitor, a first plurality of capacitor plates positioned in an array about said revolvable member to be connected electrically with said terminal capacitor plate on said electrically conductive extended portion to couple a signal with a respective antenna element, a second plurality of capacitance plates positioned circumferentially on said revolvable member to couple with the capacitor plates of inactive antenna elements, and impedance means connected with each of said inactive capacitance plates to suppress interaction of signals between adjacent antenna elements, each of said impedance means also being connected to ground and comprising a predetermined value of reactance for detuning said signals and a predetermined value of resistance for dampening said signals.

References Cited by the Examiner

UNITED STATES PATENTS

| | | | |
|---|---|---|---|
| 2,188,649 | 1/40 | Carter | 343—799 |
| 2,410,657 | 11/46 | Hershberger | 343—876 X |
| 2,444,425 | 7/48 | Busignies | 343—854 X |
| 2,445,793 | 7/48 | Marchand | 333—7 |
| 2,452,202 | 10/48 | Lindenblad | 343—854 X |
| 2,466,354 | 4/49 | Bagnall | 343—854 |
| 2,477,635 | 8/49 | Marchand | 333—7 |
| 2,711,440 | 6/55 | Rines | 343—754 |
| 2,720,589 | 10/55 | Proctor | 343—754 |
| 2,762,016 | 9/56 | Montani | 333—7 |
| 2,958,054 | 10/60 | Concelman | 333—97 |
| 3,044,063 | 7/62 | Russell | 343—854 |

FOREIGN PATENTS 732,979   2/55   Great Britain.

HERMAN KARL SAALBACH, *Primary Examiner.*

GEORGE N. WESTBY, *Examiner.*